United States Patent
Li et al.

(10) Patent No.: US 7,683,990 B2
(45) Date of Patent: Mar. 23, 2010

(54) MULTI-DOMAIN VERTICAL ALIGNMENT LIQUID CRYSTAL DISPLAY PANEL

(75) Inventors: De-Jiun Li, Taipei County (TW);
Ta-Wei Wu, Taipei County (TW);
Chun-Ming Huang, Tainan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 599 days.

(21) Appl. No.: 11/609,906

(22) Filed: Dec. 13, 2006

(65) Prior Publication Data

US 2008/0143947 A1 Jun. 19, 2008

(51) Int. Cl.
*G02F 1/1337* (2006.01)
(52) U.S. Cl. ...................................... 349/129
(58) Field of Classification Search .................. 349/129
See application file for complete search history.

(56) References Cited

U.S. PATENT DOCUMENTS 6,850,300 B2 2/2005 Lee et al.

2001/0019389 A1* 9/2001 Lee et al. ..................... 349/129
2003/0001998 A1* 1/2003 Kun ............................ 349/129
2005/0030458 A1 2/2005 Sasabayashi et al.
2005/0270462 A1* 12/2005 Koma ......................... 349/129
2006/0146242 A1* 7/2006 Kim et al. .................... 349/129
2007/0222931 A1* 9/2007 Chang et al. ................. 349/129

FOREIGN PATENT DOCUMENTS

CN 16878314 10/2005

OTHER PUBLICATIONS

"1st Office Action of Chinese counterpart application", issued on Jul. 31, 2009, p. 1-p. 6.

* cited by examiner

*Primary Examiner*—David Nelms
*Assistant Examiner*—W. Patty Chen
(74) *Attorney, Agent, or Firm*—Jianq Chyun IP Office

(57) ABSTRACT

An MVA LCD including an active device array substrate, an opposite substrate and a liquid crystal layer is provided. The liquid crystal layer is disposed between the active device array substrate and the opposite substrate, the active device array substrate has pixel units, and the liquid crystal layer above each pixel unit is divided into several domain sets. Each domain set includes at least four domains having the same size, and at least the size of one of the domains in a domain set is different from the size of one of the domains in another domain set.

10 Claims, 6 Drawing Sheets

MULTI-DOMAIN VERTICAL ALIGNMENT LIQUID CRYSTAL DISPLAY PANEL

BACKGROUND OF THE INVENTION

1. Field of the Invention

The present invention generally relates to a liquid crystal display panel, and more particularly, to a multi-domain vertical alignment liquid crystal display (MVA LCD) panel.

2. Description of Related Art

Nowadays, multimedia technology has been well developed, which mostly benefits from the development of semiconductor devices and display apparatuses. As for the display, the liquid crystal display having superior features, such as high definition, good space utilization efficiency, low power consumption and no radiation, becomes the mainstream of the market.

To have a better display quality, the liquid crystal displays with high contrast ratio, no gray scale inversion, little color shift, high luminance, full color, high brightness, high responsive speed and wide viewing angle are the development trend. From the aspect of the wide viewing angle technology, the common displays include In-Plane Switching (IPS) LCD, Twisted Nematic (TN) LCD, fringe field switching LCD and multi-domain vertical alignment (MVA) LCD and the like.

FIG. 1 is a schematic drawing of the conventional MVA LCD. To simplify the description and emphasize the key point, some of the devices are omitted in the drawing, and only the alignment bumps are mentioned hereinafter. Referring to FIG. 1, the conventional MVA LCD includes a plurality of first alignment bumps 110 and a plurality of second alignment bumps 120. The first alignment bumps 110 are disposed on the color filter substrate (not shown), and the second alignment bumps 120 are disposed on the thin film transistor array substrate (not shown). It should be noted that the first alignment bumps 110 and the second alignment bumps 120 divide a plurality of domain sets S, and each domain set S divides different types of alignment domains A, B, C and D so that the liquid crystal molecules can be aligned in multiple directions. Therefore, the MVA LCD 100 can display wide viewing angle effect.

In order to further improve the display quality of frames, two different distances L1 and L2 are between the first alignment bumps and the second alignment bumps. In this way, the liquid crystal molecules corresponding to the distances L1 and L2 present different tilt angles under the same driving voltage. In other words, one pixel has two characteristic curves of the driving voltage transmittance, so that the displaying frames can have wider viewing angles.

Please note that, due to the layout manner of the first alignment bumps 110 and the second alignment bumps 120, the areas of the alignment domains A(C) and B(D) under the same domain set S are different. Because the liquid crystal molecules corresponding to the alignment domains A(C) and B(D) tilt in different directions after being applied to the driving voltage, the display result will be obviously inconsistent when viewing from the right side and the left side. Hence, the problem is in need for solution.

SUMMARY OF THE INVENTION

Accordingly, the present invention provides a multi-domain vertical alignment (MVA) LCD, which effectively solves the display non-uniformity problem resulted from different viewing angles.

As embodied and broadly described herein, the present invention provides an MVA LCD, which includes an active device array substrate, an opposite substrate and a liquid crystal layer. Wherein, the active device array substrate includes a plurality of pixel units, and the liquid crystal layer is disposed between the active device array substrate and the opposite substrate. The crystal liquid layer above each pixel unit divides a plurality of domain sets, wherein each domain set includes at least four domains having the same size, and at least the area of one domain in a domain set is different from the area of one domain in another domain set.

According to one embodiment of the present invention, the four domains having the same size are arranged in two pairs in the form of <<.

According to one embodiment of the present invention, a same pixel unit further has two domain sets which respectively have six domains, and the two domains are arranged in a row and are symmetrical in shape.

According to one embodiment of the present invention, the MVA LCD further includes a plurality of first bumps and a plurality of second bumps. The first bumps are disposed on the active device array substrate, the second bumps are disposed on the opposite substrate, and the first bumps and the second bumps jointly divide the domains.

In an embodiment of the present invention, each of the pixel units comprises a first active device, a pixel electrode and a plurality of first bumps. The active device is disposed on a substrate, and the pixel electrode and the active device are electrically connected. Further, the first bumps are disposed on the pixel electrode to divide the domains.

According to one embodiment of the present invention, the opposite substrate includes a common electrode layer and a plurality of second bumps. Wherein, the common electrode layer is disposed on a substrate material. A plurality of second bumps is disposed on the common electrode layer to divide the domains.

According to one embodiment of the present invention, the MVA LCD further includes a plurality of first slits and a plurality of second slits. The first slits are disposed on a pixel electrode of each pixel unit. The second slits are disposed between a common electrode layer of the opposite substrate, and the first slits and the second slits jointly divide the domains.

In an embodiment of the present invention, each of the pixel units comprises an active device, a pixel electrode and a plurality of first slits. The first slits are disposed on the pixel electrode to divide the domains. The active device is disposed on a substrate, and the pixel electrode and the active device are electrically connected.

According to one embodiment of the present invention, the opposite substrate includes a common electrode layer and a plurality of second slits. Wherein, the common electrode layer is disposed on a substrate material, and the second slits are disposed on the common electrode layer to divide the domains.

In one embodiment of the present invention, each domain set includes all types of domains.

In one embodiment of the present invention, the areas of the domains set in the same pixel unit are different.

In summary, the MVA LCD of the present invention has more than two domain sets, therefore, a same pixel unit corresponds to two characteristic curves of driving voltage transmittance, so as to achieve wide viewing angle effect. In the present invention, the pixel unit is divided into various types of domains having the same size, the display effect is uniform whether viewed from the right side or the left side.

In order to make the aforementioned and other objectives, features and advantages of the present invention comprehensible, preferred embodiment accompanied with figures are described in detail below. It is to be understood that both the foregoing general description and the following detailed description are exemplary, and are intended to provide further explanation of the invention as claimed.

DESCRIPTION OF EMBODIMENTS

First Embodiment

Figure 1:
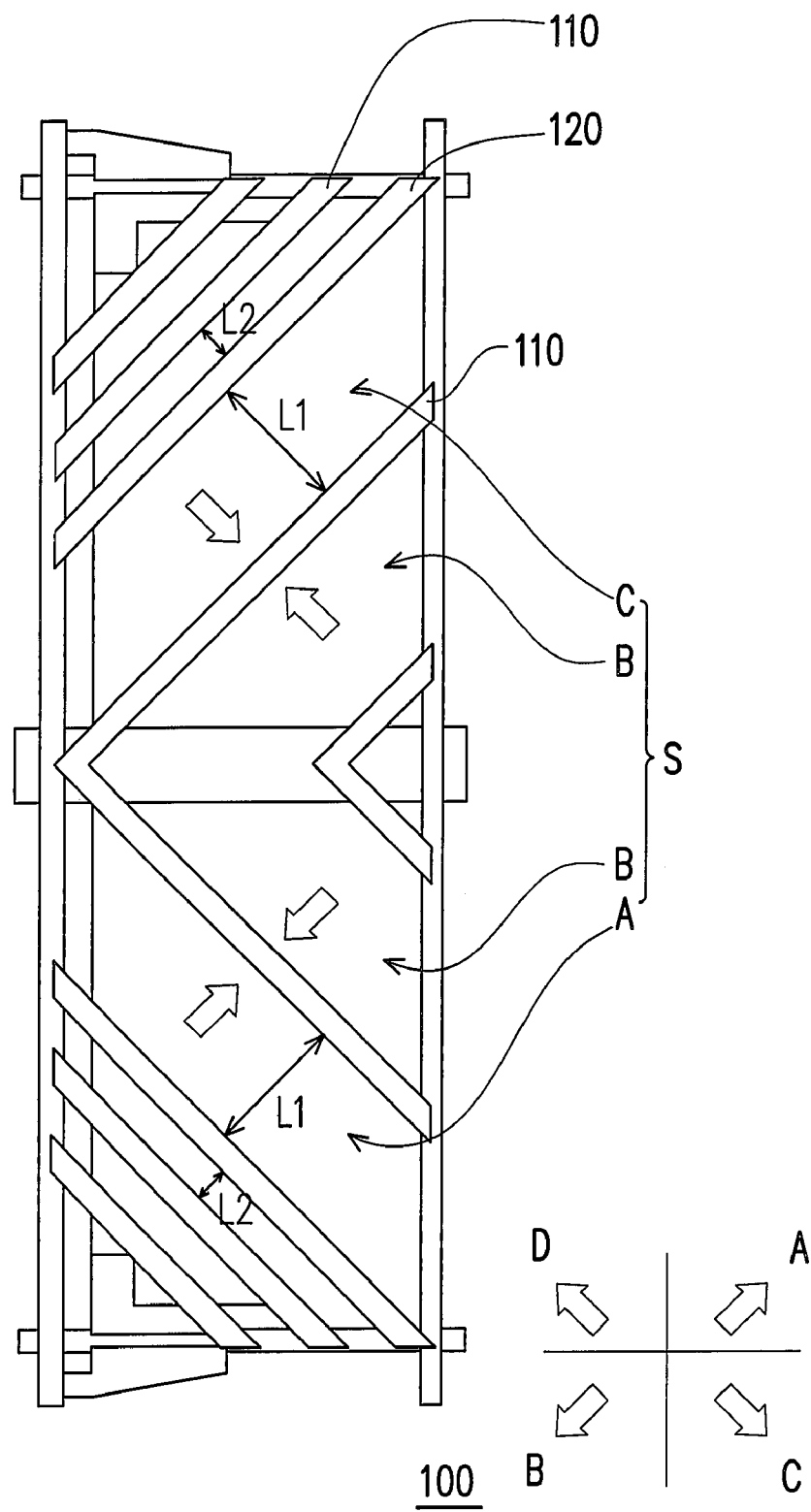
FIG. 1 is a schematic drawing of the conventional MVA LCD.
Figure 2A:
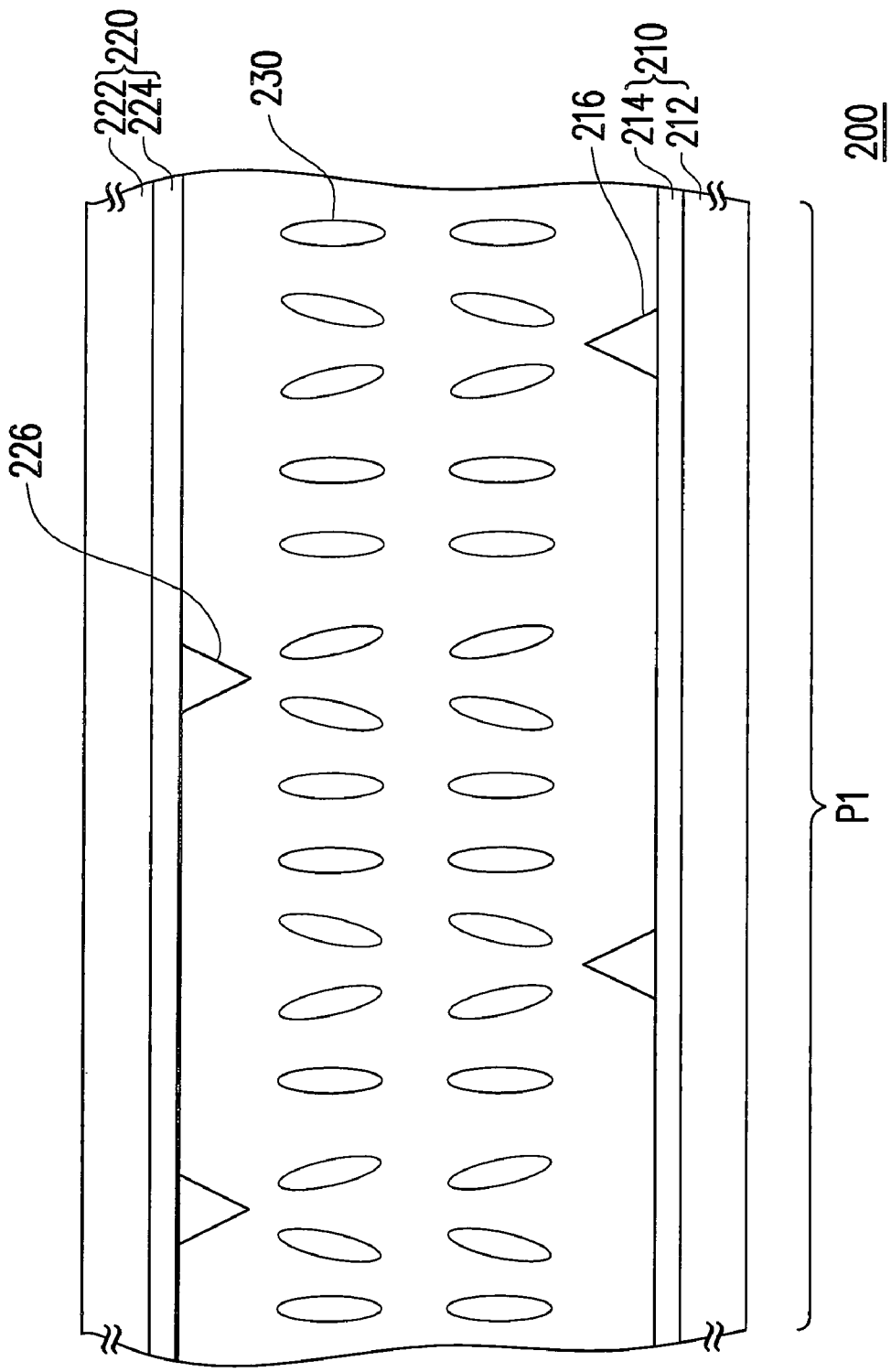
FIG. 2A is a local cross sectional view of the MVA LCD according to the first embodiment of the present invention.
Figure 2B:
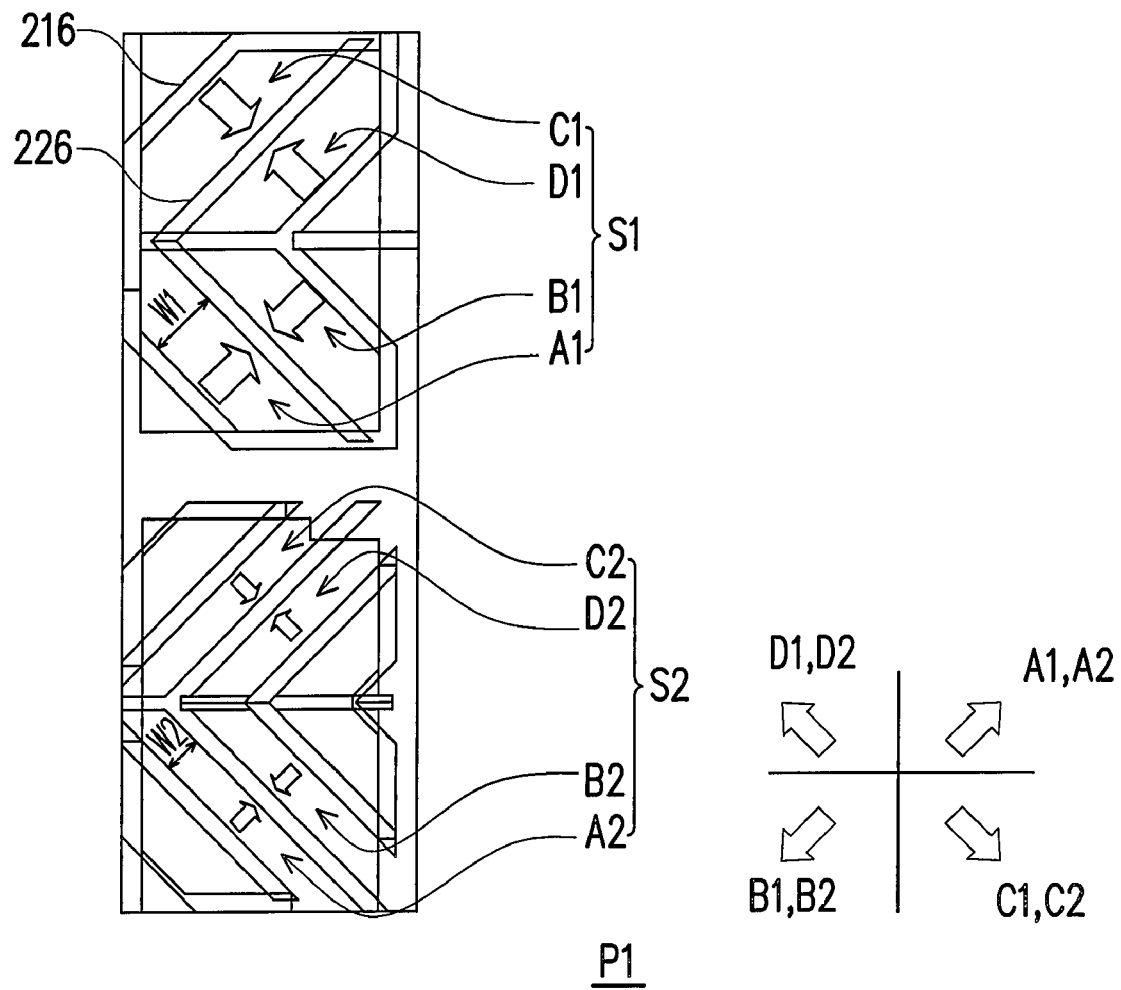
FIG. 2B is a schematic view of the pixel unit according to the first embodiment of the present invention.

FIG. 2A illustrates a local cross sectional view of the MVA LCD according to the first embodiment of the present invention, and FIG. 2B is a schematic view of the pixel unit according to the first embodiment of the present invention. Referring to FIGS. 2A and 2B, the MVA LCD 200 includes an active device array substrate 210, an opposite substrate 220 and a liquid crystal layer 230. Wherein, the liquid crystal layer 230 is sandwiched between the active device array substrate 210 and the opposite substrate 220. In specific, the active device array substrate 210 includes a plurality of pixel units P1 (only one pixel is shown in FIG. 2B for description). The liquid crystal layer 230 above each pixel unit P1 is divided into several domain sets S1 and S2. In the embodiment, only two domain sets are illustrated for description.

Please note that domain set S1 at least has four domains A1, B1, C1 and D1 with the same or similar size. Similarly, domain set S2 at least has four domains A2, B2, C2 and D2 with the same or similar size. The domain A1 of the domain set S1 and the domain A2 of the domain set S2 are different sizes. In practice, the size of each domain can be achieved by changing the width of each domain. In the embodiment, the width W1 of domain A1 is, for example, 40 um, and the width W2 of domain A2 is, for example, 25 um. The abovementioned different domain sets S1 and S2 enable a same pixel unit P1 to correspond at least two types of characteristic curves of driving voltage transmittance. In addition, domains A1, B1, C1 and D1 (A2, B2, C2 and D2) of domain set S1 (S2) include the domains with different alignment, so that the liquid crystal molecules tilt at different directions. Thus, the display frames have wide viewing angles.

A plurality of first bumps 216 (as shown in FIG. 2A) on the active device array substrate 210 and a plurality of second bumps 226 on the opposite substrate 220 are formed to divide domain set S1 and domain set S2. In more detail, the active device array substrate 210 mainly includes a substrate 212, a pixel electrode 214 and a plurality of active devices (not shown); and the first bumps 216 are disposed on the pixel electrode 214. The opposite substrate 220 includes a substrate material 222 and a common electrode layer 224, and the second bumps 226 are disposed on the common electrode layer 224. Please note that the substrate material 222 can be color filter; for example, if the active device array substrate 210 adopts the COA (Color filter On Array) technique, the substrate material 222 can be transparent glass.

As described, the domain set S1 can be divided into domains A1, B1, C1 and D1 having the same or similar size by the first bumps 216 and the second bumps 226, and each pair is arranged in a form of "<<". Similarly, the domain set S2 can be divided into domains A2, B2, C2 and D2 having the same or similar size by the first bumps 216 and the second bumps 226. It should be emphasized that, because the domain set S1 (S2) has respectively four domains A1, B1, C1 and D1 (A2, B2, C2 and D2) with the same or similar size, the display effect is uniform regardless viewing from the right side or the left side.

Figure 3:
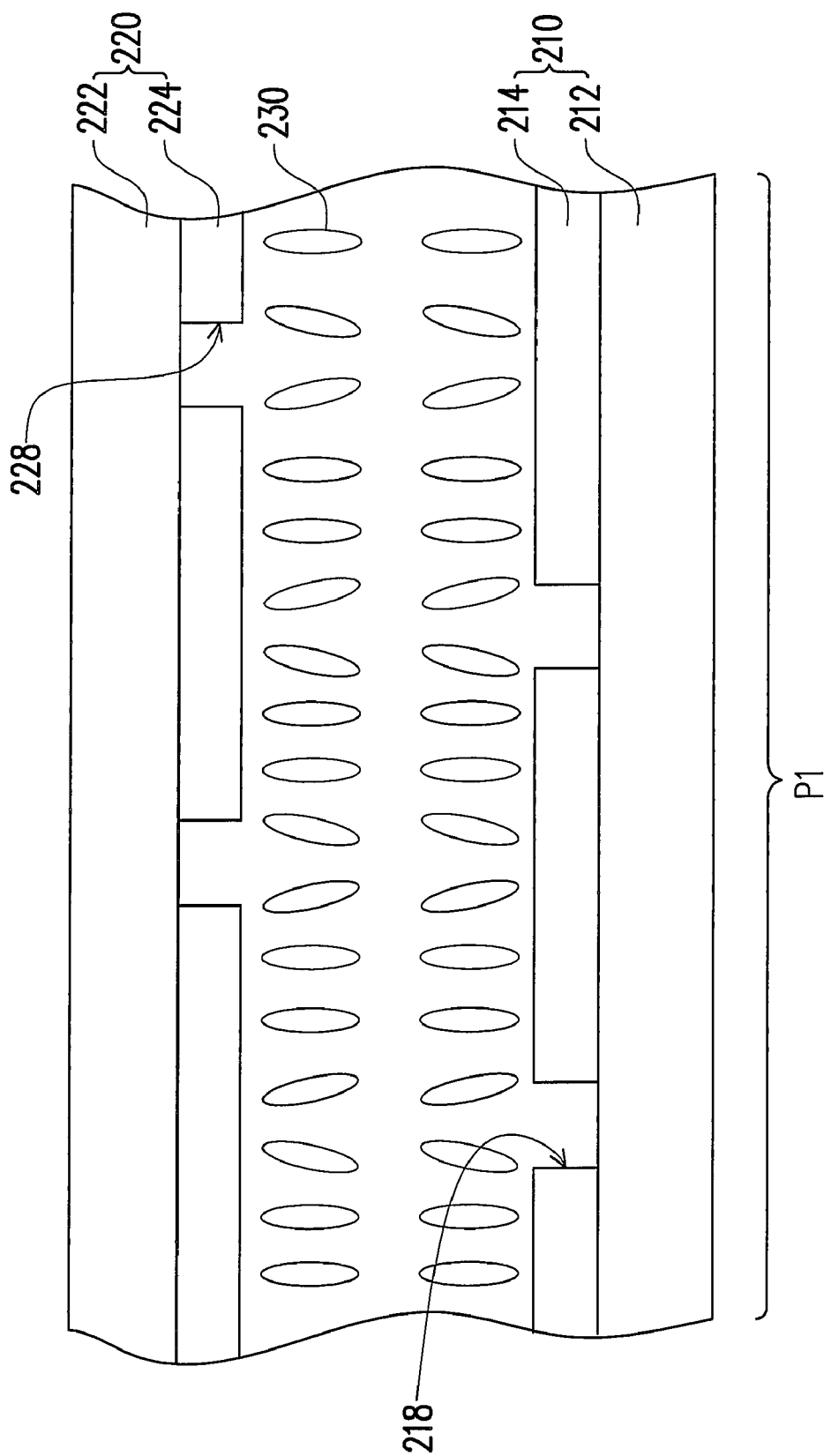
FIG. 3 illustrates the schematic view of the first slits and the second slits according to the first embodiment of the present invention.

Of course, those skilled in the art should know that the domain sets S1 and S2 can be divided only by the first bumps 216 on the active device array substrate 210, or only by the second bumps 226 of the opposite substrate 220; the present invention should by no means limit to this. Besides, the domain sets S1 and S2 can be divided by forming a plurality of first slits 218 (as shown in FIG. 3) on the pixel electrode 214 and a plurality of second slits 228 on the common electrode layer 224. Certainly, the domain sets S1 and S2 can be divided only by the first slits 218 on the pixel electrode 214, or only by the second slits 228 on the common electrode layer 224.

Second Embodiment

Figure 4:
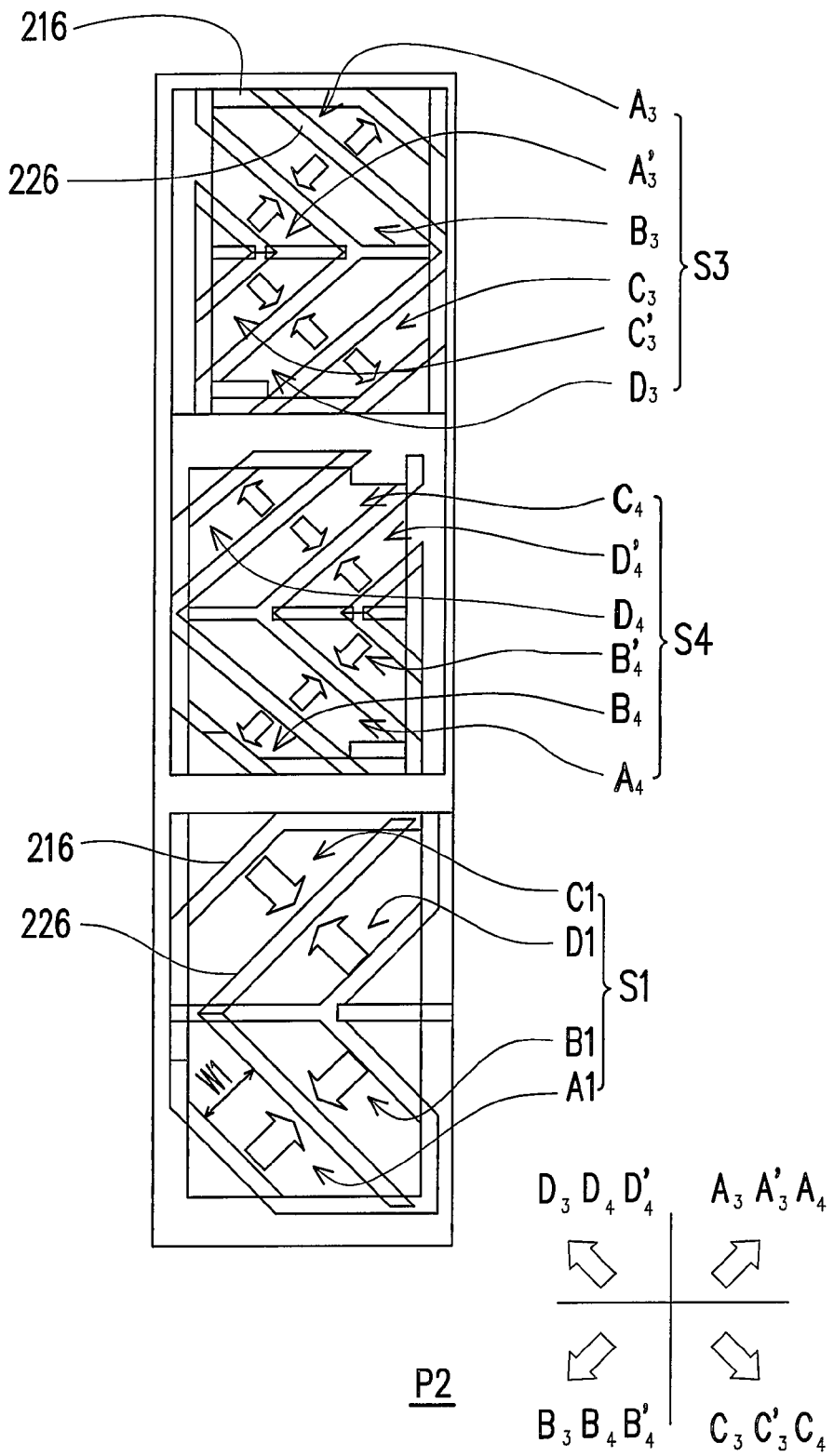
FIG. 4 is a schematic view of the pixel unit according to the second embodiment of the present invention.

FIG. 4 is a schematic view of the pixel unit according to the second embodiment of the present invention. Referring to FIG. 4, the pixel unit P2 can be divided into three domain sets S1, S3 and S4 by the first bumps 216 and the second bumps 226. The domain set S1 has been disclosed in the first embodiment, and the detailed description is omitted here. Particularly, the domain set S3 has six domains A3, A3', B3, C3, C3' and D3. The domains A3 and A3' have the same alignment and the domains C3 and C3' have the same alignment. The domain set S4 similarly has six domains A4, B4, B4', C4, D4 and D4'. The domains B4 and B4' have the same alignment and the domains D4 and D4' have the same alignment.

It should point out here that the domain set S3 is divided into four domains A3, A3', C3 and C3' having the same size and two smaller (or larger) domains B3 and D3 by the first bumps 216 and the second bumps 226. That is, not all the sizes of the domains in the domain set S3 are the same. In order to have a uniform display effect viewing from both of the right and left sides, the shape of the domain set S4 and the shape of the domain set S3 are symmetrical. In other words, each domain A3, A3', B3, C3, C3' and D3 of the domain set S3 and each domain A4, B4, B4', C4, D4 and D4' of the domain set S4 are symmetrically arranged, so as to present a desired display effect.

Of course, those skilled in the art should know that the number of the domains in the domain set S3 is exemplary, and is by no means limited to the present invention.

Third Embodiment

Figure 5:
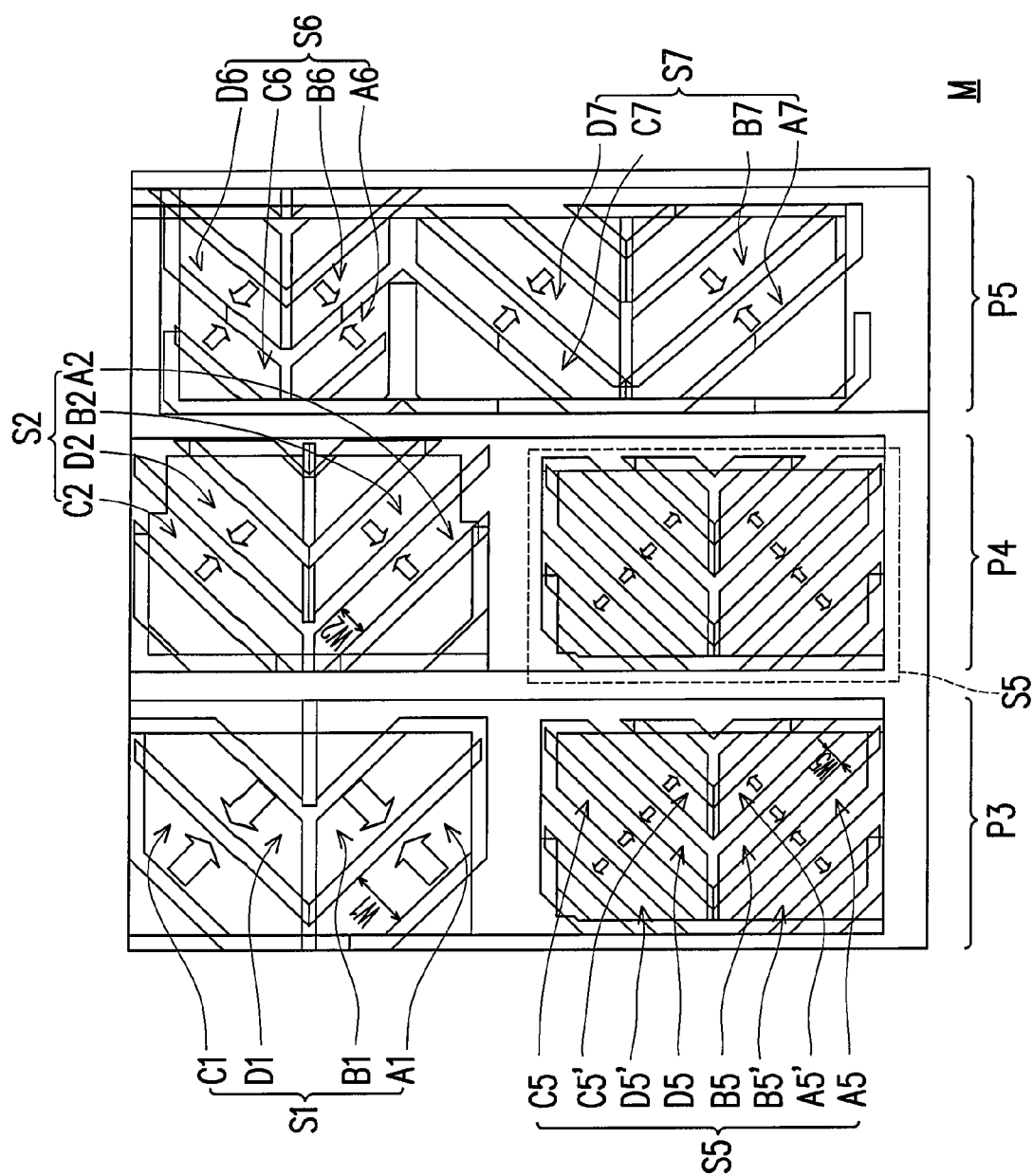
FIG. 5 is a schematic view of the pixel unit according to the third embodiment of the present invention.

Generally speaking, a main pixel is composed by three pixel units, which respectively display red light, green light and blue light to achieve a full color effect of the display frames. FIG. 5 is a schematic view of the pixel unit according to the third embodiment of the present invention. Referring to FIG. 5, the main pixel M is composed by pixel units P3, P4 and P5. Due to the inherent difference of optical characteristics of red light, green light and blue light, pixel units P3, P4 and P5 can appropriately adjust the respective domains according to the display color, thereby achieving a good display effect.

In more detail, pixel unit P3 is mainly formed by domain sets S1 and S5, and the description of the domain set S1 has been described in the first embodiment and is not repeated. The domain set S5 has eight domains A5, A5', B5, B5', C5, C5', D5 and D5'. The width W5 of each domain in the domain set S5 is smaller than the width W1 of each domain in the domain set S1, so that the domain sets S1 and S2 respectively correspond to two different characteristic curves of driving voltage transmittance. Thus, the color effect displayed by the pixel unit P3 can be adjusted.

As described, domain A5 and domain A5' have the same alignment; domain B5 and domain B5' have the same alignment; domain C5 and domain C5' have the same alignment; and domain D5 and domain D5' have the same alignment. It should be noted that domain A5 and domain B5 are the same size and domain A5' and domain B5' are the same size. In other words, the area of domains A5 and A5' is equal to the area of domains B5 and B5'. Likewise, the area of domains C5 and C5' is equal to the area of domains D5 and D5'. As a result, a uniform display effect viewing from either the left side or the right side is achieved.

In addition, the pixel unit P4 is mainly composed by domain sets S2 and S5, and the pixel unit P5 is mainly composed by domain sets S6 and S7. The domain set S2 has been disclosed in the first embodiment, and the detailed description is omitted here. Similarly, pixel units P4 and P5 can divide suitable domains according to the color characteristics of which are to be displayed. Note that the domain set S6 of the pixel unit P5 has four domains A6, B6, C6 and D6 having the same or similar size while the domain set S7 has four domains A7, B7, C7 and D7 having the same or similar size. The area of the domain set S6 and the area of the domain set S7 in the same pixel unit P5 can be properly adjusted to meet the practical need of display effect, and the areas are not required to be the same.

In summary, the pixel unit of the MVA LCD of the present invention has more than two domain sets, therefore, a same pixel unit corresponds to two characteristic curves of driving voltage transmittance, so as to achieve wide viewing angle. In the present invention, the pixel unit is divided into various types of domains having the same or similar size; therefore, the display effect is uniform whether being viewed from the right side or the left side.

What is claimed is:

1. A multi-domain vertical alignment liquid crystal display panel (MVA LCD), comprising:
    an active device array substrate, having a plurality of pixel units;
    an opposite substrate; and
    a liquid crystal layer, disposed between the active device array substrate and the opposite substrate, the liquid crystal layer above each pixel unit divides a plurality of domain sets, wherein each domain set comprises at least four domains having the same or similar size, and at least a size of one of the domains in a domain set is different from a size of one of the domains in another domain set,
    wherein a same pixel unit has two domain sets which respectively have six domains, and the two domains are arranged in a row and are symmetrical in shape.

2. The MVA LCD as claimed in claim 1, wherein four domains having the same or similar size are arranged in two pairs in a form of <<.

3. The MVA LCD as claimed in claim 1, further comprising:
    a plurality of first bumps, disposed on the active device array substrate; and
    a plurality of second bumps, disposed on the opposite substrate, and the first bumps and the second bumps jointly divide the domains.

4. The MVA LCD as claimed in claim 1, wherein each of the pixel units further comprises:
    an active device, disposed on a substrate;
    a pixel electrode, electrically connected to the active device; and
    a plurality of first humps, disposed on the pixel electrode to divide the domains.

5. The MVA LCD as claimed in claim 1, wherein the opposite substrate comprises:
    a substrate material;
    a common electrode layer, disposed on the substrate material; and
    a plurality of second bumps, disposed on the common electrode layer to divide the domains.

6. The MVA LCD as claimed in claim 1, further comprising:
    a plurality of first slits, disposed on a pixel electrode of each pixel unit; and
    a plurality of second slits, disposed between a common electrode layer of the opposite substrate, and the first slits and the second slits jointly divide the domains.

7. The MVA LCD as claimed in claim 1, wherein each of the pixel units further comprises:
    an active device, disposed on a substrate;
    a pixel electrode, electrically connected to the active device; and
    a plurality of first slits, disposed on the pixel electrode to divide the domains.

8. The MVA LCD as claimed in claim 1, wherein the opposite substrate comprises:
    a substrate material;
    a common electrode layer, disposed on the substrate material; and
    a plurality of second slits, disposed on the common electrode layer to divide the domains.

9. The MVA LCD as claimed in claim 1, wherein the domains of each domain set comprises all types of domains.

10. The MVA LCD as claimed in claim 1, wherein the areas of the domains set in the same pixel unit are different.

* * * * *